(12) United States Patent
Ansari et al.

(10) Patent No.: US 11,039,041 B2
(45) Date of Patent: Jun. 15, 2021

(54) DISPLAY PANEL SYNCHRONIZATION FOR A DISPLAY DEVICE

(71) Applicant: Intel Corporation, Santa Clara, CA (US)

(72) Inventors: Nausheen Ansari, Folsom, CA (US); Nobuyuki Suzuki, Portland, OR (US); Zhiming Zhuang, Sammamish, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/944,344

(22) Filed: Apr. 3, 2018

(65) Prior Publication Data

US 2019/0045088 A1    Feb. 7, 2019

(51) Int. Cl.
*H04N 5/04*      (2006.01)
*G09G 5/00*      (2006.01)
*G09G 5/12*      (2006.01)
*G06F 3/14*      (2006.01)

(52) U.S. Cl.
CPC ............. *H04N 5/04* (2013.01); *G06F 3/1446* (2013.01); *G09G 5/003* (2013.01); *G09G 5/006* (2013.01); *G09G 5/12* (2013.01); *G09G 2310/08* (2013.01); *G09G 2340/0435* (2013.01); *G09G 2360/04* (2013.01); *G09G 2370/04* (2013.01); *G09G 2370/12* (2013.01); *G09G 2380/02* (2013.01)

(58) Field of Classification Search
CPC ........ H04N 5/04; G06F 3/1446; G09G 5/003; G09G 5/006; G09G 5/12
USPC .......... 348/500, 513; 345/520, 545; 715/761
See application file for complete search history.

(56) References Cited

U.S. PATENT DOCUMENTS

| 2008/0100598 | A1* | 5/2008 | Juenger | G09G 5/36 345/204 |
| 2010/0058205 | A1* | 3/2010 | Vakil | G06F 1/1616 715/761 |
| 2010/0208029 | A1* | 8/2010 | Marti | G02B 27/01 348/14.02 |

(Continued)

FOREIGN PATENT DOCUMENTS

EP    2998956 A1    3/2016

OTHER PUBLICATIONS

Extended European Search Report dated Jul. 4, 2019, in EP Application No. 19160419.8, filed Mar. 1, 2019; 16 pages.

(Continued)

*Primary Examiner* — John W Miller
*Assistant Examiner* — Sean N. Haiem
(74) *Attorney, Agent, or Firm* — Hanley, Flight & Zimmerman, LLC (57) ABSTRACT

Technology for a display device is described. The display device can include one or more display screens operable to show at least two display panels. The display device can include a controller. The controller can send a request for frame data from each of the at least two display panels to a source device. The controller can receive, from the source device, a same frame indication for each of the at least two display panels. The controller can provide frame data received from the source device based on the same frame indication to the at least two display panels. The same frame indication can cause the at least two display panels to synchronously display frame data received from the source device.

23 Claims, 6 Drawing Sheets

(56) References Cited

U.S. PATENT DOCUMENTS

| | | | |
|---|---|---|---|
| 2011/0205433 A1* | 8/2011 | Altmann | H04N 9/475 |
| | | | 348/513 |
| 2012/0147976 A1* | 6/2012 | Ries | G09G 5/006 |
| | | | 375/240.28 |
| 2014/0055476 A1* | 2/2014 | Wang | G09G 5/003 |
| | | | 345/547 |
| 2015/0172590 A1* | 6/2015 | Wang | G09G 5/393 |
| | | | 345/545 |
| 2015/0304526 A1* | 10/2015 | Maurice | H04N 21/4307 |
| | | | 348/513 |
| 2016/0117971 A1* | 4/2016 | Scchetto | G09G 3/20 |
| | | | 345/589 |
| 2016/0180804 A1* | 6/2016 | Suzuki | G09G 5/006 |
| | | | 345/520 |
| 2016/0239249 A1* | 8/2016 | Lee | G09G 5/12 |
| 2016/0275908 A1* | 9/2016 | Kim | G06F 3/1423 |
| 2017/0193971 A1* | 7/2017 | Bi | G09G 5/12 |
| 2018/0053284 A1* | 2/2018 | Rodriguez | G06T 5/006 |
| 2018/0075798 A1* | 3/2018 | Nho | G09G 3/32 |
| 2018/0286345 A1* | 10/2018 | Lee | G09G 5/006 |

OTHER PUBLICATIONS

Partial European Search Report dated Jul. 4, 2019, in EP Application No. 19160419.8, filed Mar. 1, 2019; 16 pages.

\* cited by examiner

DISPLAY PANEL SYNCHRONIZATION FOR A DISPLAY DEVICE

BACKGROUND

Display interfaces can allow audio/video to be transmitted from a source device to a display device. Common types of display interfaces include, but are not limited to, High-Definition Multimedia Interface (HDMI), DisplayPort (DP), embedded DisplayPort (eDP), or Mobile Industry Processor Interface (MIPI) display serial interface (DSI). HDMI is a proprietary audio/video interface for transmitting uncompressed video data and compressed/uncompressed digital audio data from an HDMI-compliant source device, such as a display controller, to a compatible computer monitor, video projector, digital television or digital audio device. HDMI is a digital replacement for analog video standards. DisplayPort is a digital display interface that is standardized by the Video Electronics Standards Association (VESA). DisplayPort is an interface that is used to connect a video source to a display device, such as a computer monitor, and can carry audio and other forms of data. DisplayPort was designed to replace Video Graphics Array (VGA) and Digital Visual Interface (DVI). The DisplayPort interface is backward compatible with other interfaces, such as HDMI and DVI. eDP defines a standardized display panel interface for internal connections, e.g., graphics cards to notebook display panels. The MIPI DSI defines a high-speed serial interface between a host processor and a display module. The MIPI DSI enables manufacturers to integrate displays to achieve high performance and improved imagery and video scenes. The MIPI DSI is commonly used for displays in smartphones, tablets, laptops and vehicles.

BRIEF DESCRIPTION OF THE DRAWINGS

Features and advantages of technology embodiments will be apparent from the detailed description which follows, taken in conjunction with the accompanying drawings, which together illustrate, by way of example, technology features; and, wherein.

Reference will now be made to the exemplary embodiments illustrated, and specific language will be used herein to describe the same. It will nevertheless be understood that no limitation on technology scope is thereby intended.

DESCRIPTION OF EMBODIMENTS

Before the disclosed technology embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to provide a thorough understanding of various technology embodiments. One skilled in the relevant art will recognize, however, that such detailed embodiments do not limit the overall technological concepts articulated herein, but are merely representative thereof.

As used in this written description, the singular forms "a," "an" and "the" include express support for plural referents unless the context clearly dictates otherwise. Thus, for example, reference to "a bit line" includes a plurality of such bit lines.

Reference throughout this specification to "an example" means that a particular feature, structure, or characteristic described in connection with the example is included in at least one technology embodiment. Thus, appearances of the phrases "in an example" or "an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of disclosure embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term in this written description like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," "maximized," "minimized," and the like refer to a property, function, or result of a device, component, or activity that is measurably different from other comparable devices, components, or activities in a surrounding or adjacent area, in a single device or in multiple comparable devices, in a group or class, in multiple groups or classes, or as compared to the known state of the art. For example, a data region that has an "increased" risk of corruption can refer to a region of a memory device which is more likely to have write errors to it than other regions in the same memory device. A number of factors can cause such increased risk, including location, fabrication process, number of program pulses applied to the region, etc.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

The term "coupled," as used herein, is defined as directly or indirectly connected in an electrical or nonelectrical manner. "Directly coupled" items or objects are in physical contact and attached to one another. Objects or elements described herein as being "adjacent to" each other may be in physical contact with each other, in close proximity to each other, or in the same general region or area as each other, as appropriate for the context in which the phrase is used.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

As used herein, the term "processor" can include general purpose processors, specialized processors such as central processing units (CPUs), graphics processing units (GPUs), digital signal processors (DSPs), microcontrollers (MCUs), embedded controller (ECs), field programmable gate arrays (FPGAs), or other types of specialized processors, as well as base band processors used in transceivers to send, receive, and process wireless communications.

It should be understood that many of the functional units described in this specification may have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

This same principle applies to ranges reciting only one numerical value as a minimum or a maximum. Furthermore, such an interpretation should apply regardless of the breadth of the range or the characteristics being described.

EXAMPLE EMBODIMENTS

An initial overview of technology embodiments is provided below and then specific technology embodiments are described in further detail later. This initial summary is intended to aid readers in understanding the technology more quickly, but is not intended to identify key or essential technological features nor is it intended to limit the scope of the claimed subject matter. Unless defined otherwise, all technical and scientific terms used herein have the same meaning as commonly understood by one of ordinary skill in the art to which this disclosure belongs.

For various types of display panels, e.g., HDMI display panels, DP display panels, eDP display panels, MIPI DSI Video Mode display panels, etc., timings for the display panels can be driven by a source device. When multiple display panels or multiple embedded display panels are to be synced in accordance with an adaptive sync capability provided by HDMI/DP/eDP, the source device can refresh the display panels in sync. In this example, multiple display panels can be running and video can be playing across the multiple display panels. The multiple display panels can be refreshed concurrently (at the same time) in accordance with the adaptive sync capability. Otherwise, one display panel can update to a new frame, while another display panel continues to show an old frame, thereby showing a "tear" in a middle of a screen to a viewer. With HDMI/DP/eDP, the source device is the master of time. The source device can ensure that the frames are being concurrently sent to the multiple display panels. The sync can run on the timings that are coming from the source device, so the multiple display panels can be in sync.

In contrast, for MIPI DSI Command Mode display panels, the timings can be driven by timing controllers (TCONs) associated with the MIPI DSI Command Mode display panels themselves. In other words, the MIPI DSI Command Mode display panels can be the masters of time (as opposed to the source device). Multiple MIPI DSI Command Mode display panels can maintain their own timings. As a result, the multiple MIPI DSI Command Mode display panels can potentially become out of sync because these display panels are not being controlled by a common source device (as in HDMI/DP/eDP). Therefore, maintaining timing synchronization between multiple MIPI DSI Command Mode display panels can be difficult due to their independent TCONs.

Generally speaking, Command Mode is used for a MIPI DSI display panel when the display panel is integrated with a display controller and a frame buffer. A frame transfer can occur in a form of a command followed by frame data and/or parameters. A start of the frame transfer can be controlled by the MIPI DSI display panel using the Tearing Enable (TE) either by an external pin, TE line, or via DSI lanes using the TE trigger message.

In one example, in MIPI DSI Command Mode, display panels can control their own timings. A display panel can indicate when ready to accept data through a single wire driven from the display panel to a source. This wire can be set up to indicate lines but most implementations use the wire to indicate a vsync (or a frame start). After completing a frame, the display panel can drive a TE pin that indicates to the source to send data for the next frame. MIPI DSI Command Mode panels are expected to have buffering; currently all command mode panels have one frame buffer. In contrast, MIPI DSI Video Mode is a mode in which the source drives timings to the display panel. The pixel timings at which the display panel is scanning out the pixels on the screen are driven from the source. In this case, horizontal blank starts, blank ends and active are driven from the source. MIPI DSI Video Mode display panels are not expected to have any buffering. Other interfaces, such as Display Port/Embedded Display Port and HDMI, generally operate using MIPI DSI Video Mode.

Figure 1:
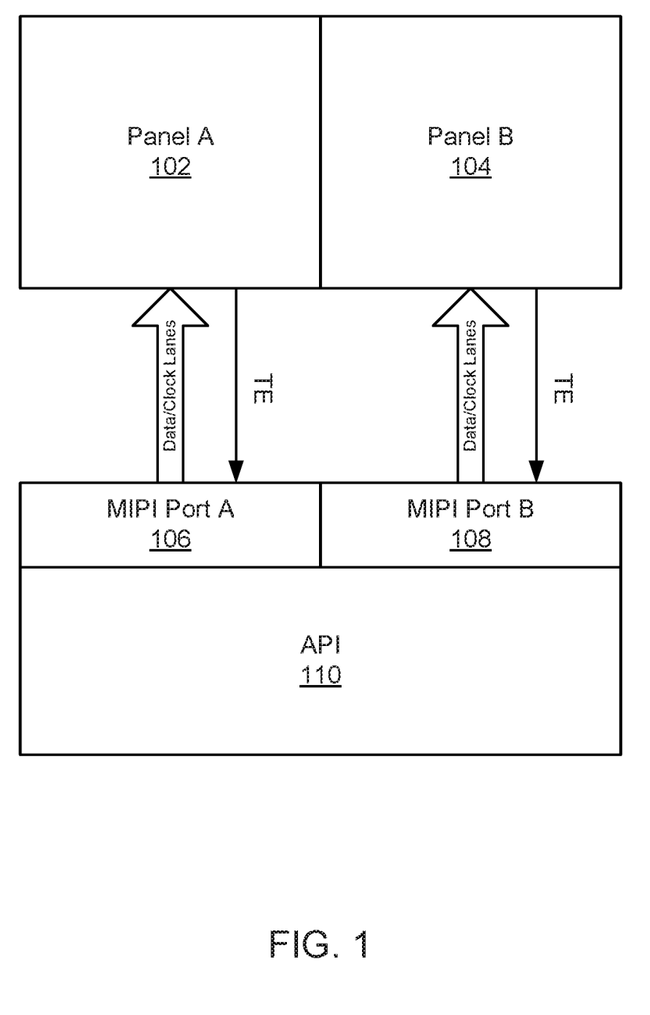
FIG. 1 illustrates two embedded MIPI DSI display panels that form a single MIPI DSI display panel in accordance with an example embodiment.

FIG. 1 illustrates an example of two embedded MIPI DSI display panels that form a single MIPI DSI display or display panel. The two embedded MIPI display panels can include Panel A 102 and Panel B 104. The two embedded MIPI display panels can be coupled to two MIPI ports, such as MIPI Port A 106 and MIPI Port B 108, respectively, which can be associated with an application programming interface (API) 110. Panel A 102 and Panel B 104 can send TE event messages to MIPI Port A 106 and MIPI Port B 108, respectively, to request frame data. Frame data and clock information can be provided from MIPI Port A 106 and MIPI Port B 108 to Panel A 102 and Panel B 104, respectively.

As shown in FIG. 1, two embedded MIPI DSI links can be placed side by side to make a single display or display panel (i.e., Panel A 102 and Panel B 104). In certain use cases (e.g., full screen playback), it is important for both display panels to refresh at the same time to avoid visual artifacts across the seam between the two panel segments. However, in previous solutions, in Command Mode, panel timings were controlled by separate TCONs in the individual MIPI DSI display panels. In previous solutions, MIPI DSI Command Mode display panels would run on their local time. The MIPI DSI Command Mode display panels would request next frame data, and the MIPI DSI Command Mode display panels would run their local times independent of a source device that was providing the frame data. In previous solutions, the source device was not aware of the panel timings for the individual MIPI DSI Command Mode display panels. As a result, in previous solutions, achieving synchronization between the two embedded MIPI DSI display panels was difficult due to the separate panel timings.

In one example, dynamic refresh rate switching (DRRS) is a capability that enables a display panel to be slowed down or speed up in relation to other display panels. A dynamic refresh rate can be used to dynamically change a refresh rate of the display panels. This DRRS capability can be used to ensure that multiple display panels are synced together. With DRRS, when one display panel begins displaying a frame late, another display panel can extend a blanking time, such that the display panels can both be refreshed concurrently. The DRRS capability can address performance limitations due to a fixed refresh rate (e.g., synchronous flips), as well as tearing and judder artifacts caused by asynchronous updates.

In the present technology, the DRRS capability can be extended to MIPI. More specifically, the DRRS capability can be employed to address synchronization between multiple embedded MIPI DSI Command Mode display panels. In previous solutions, no DRRS technique existed for MIPI DSI Command Mode display panels. In previous solutions, to achieve multiple embedded display panels, the display panels would utilize special hardware to maintain synchronization between the display panels. This previous solution was relatively expensive and added to the platform cost. In contrast, extending the DRRS capability to MIPI DSI Command Mode display panels is minimally intrusive and does not change the interconnect specification between the source device and the TCONs associated with the MIPI DSI Command Mode display panels.

In one example, advancements in display panel technology allow for display panels to be able to support a range of refresh rates and the capability to dynamically adjust refresh rates. By extending the DRRS capability to MIPI DSI Command Mode display panels using the existing capabilities in the interconnect specification, the source device can manage the refresh rate of the MIPI DSI Command Mode display panel(s), and thereby has the ability to synchronize multiple MIPI DSI Command Mode display panels.

The extension of the DRRS capability to MIPI can be exploited to support various use cases, such as foldable display devices, segmented display devices, or multiple assembled display devices that use MIPI, where multiple segments (or display panels) can be refreshed in sync. In other words, for the use case of multi-segmented embedded displays, the usage of MIPI DSI panels in Command Mode can provide numerous power and performance benefits.

In one example, by extending the DRRS capability to MIPI DSI Command Mode display panels, multiple MIPI DSI Command Mode display panels can be kept in sync. For example, a segmented display panel can be folded inward to provide one MIPI DSI Command Mode display panel. Alternatively, the segmented display panel can be folded outward to provide two separate MIPI DSI Command Mode display panels. When a full screen mode is accessed for the segmented display panel, video can be displayed across the two separate MIPI DSI Command Mode display panels. In the latter use case, to ensure that the video is being provided by the two separate MIPI DSI Command Mode display panels at the same time, both of the MIPI DSI Command Mode display panels can be refreshed concurrently. The MIPI DSI Command Mode display panels can be aligned to synchronously display the video using the DRRS capability.

In one configuration, two, three, four or more separate MIPI DSI Command Mode display panels can be synced together, such that the MIPI DSI Command Mode display panels all synchronously show video frame data at the same time. The MIPI DSI Command Mode display panels can be provided in a vehicle use case. For example, a display or display panel in a vehicle can be segmented into a number of (e.g. six) smaller MIPI DSI Command Mode display panels that separately show video frame data related to different types of vehicle information (e.g., one display panel can be used to show a vehicle speed, whereas a separate display panel can be used to show video frame data related to vehicle temperature information), and the six MIPI DSI Command Mode display panels can be refreshed concurrently using the DRRS capability. In a foldable display use case, a display device can be folded in to have a single MIPI DSI Command Mode display panel, but can also be folded out to have multiple MIPI DSI Command Mode display panels, which can be synchronized to show video frame data at the same time. In a display wall use case, multiple MIPI DSI Command Mode display panels can be synced together to effectively make a single MIPI DSI Command Mode display panel.

In one configuration, to achieve synchronization between multiple MIPI DSI Command Mode display panels when showing video frame data, a new mode for MIPI DSI Command Mode can be implemented, such that the MIPI DSI Command Mode display panels can force themselves to adhere to timings from the source device. In other words, the source device can drive the timings for each of the MIPI DSI Command Mode display panels, as opposed to each individual MIPI DSI Command Mode display panel maintaining their own independent panel timing.

In previous solutions, display panels would send TE indications to the source device to request frame data from the source device. When source device received the TE indication from a given display panel, the source device would send the frame data within a fixed duration of time, which was then shown at the display panel. In previous solutions, when frame data was not received within the fixed duration of time, the display panel would replay last frame data from a local buffer. In other words, when the display panel did not receive a frame start within a fixed duration of time, the display panel would start replaying the same frame. After a certain period of time, the display panel would start failing when the display panel was not refreshed due to new frame data not being received from the source device.

In the present technology, to achieve synchronization between multiple MIPI DSI Command Mode display panels, the MIPI DSI Command Mode display panels can each send a TE indication to the source device. The MIPI DSI Command Mode display panels can send the TE indication to request frame data from the source device. However, with the adaptive sync capability, in contrast to previous solutions, the time duration between the receipt of the TE indication at the source device and the sending of frame data from the source device to the MIPI DSI Command Mode display panel can be flexible. The source device can wait until a TE indication is received from each of the MIPI DSI Command Mode display panels that are to be synchronized, and after all of the TE indications are received, the source device can concurrently send a same frame start indication to each of the MIPI DSI Command Mode display panels. After receiving the same frame start indication from the source device, each of the MIPI DSI Command Mode display panels can concurrently show received frame data. In other words, the MIPI DSI Command Mode display panels can start displaying the frame data at the same time. By receiving the same frame start indication from the source device, the MIPI DSI Command Mode display panels can refresh the frame at the same time, thereby achieving synchronization between the MIPI DSI Command Mode display panels.

In one example, the source device can become aware of the multiple MIPI DSI Command Mode display panels. The source device can control the timings of the multiple MIPI DSI Command Mode display panels. As a result, on a frame-by-frame basis, the MIPI DSI Command Mode display panels can slave themselves to the source device, as the source device can maintain the frame-by-frame timing. The source device can be the master of time on a frame level granularity, so the source device can dictate the refresh rate of the MIPI DSI Command Mode display panels, as opposed to the display panels themselves.

In one example, this new mechanism dynamically changes the display refresh rate on a frame by frame basis so that the display refresh rate for multiple MIPI DSI Command Mode display panels will be synchronized. The refresh rate can be changed by varying a blanking period every frame (as needed) so that the frame scan-out for both MIPI DSI Command Mode display panels starts concurrently. The MIPI DSI Command Mode display panels can maintain their own blanking times. In other words, timings within the frame can continue to be controlled by the TCONs in the MIPI DSI Command Mode display panels. However, the MIPI DSI Command Mode display panels can extend their blanking (e.g., by adding vertical lines) using the DRRS capability, such that the MIPI DSI Command Mode display panels can slave themselves to the source device's timing. The MIPI DSI Command Mode display panels can each slave themselves at a frame level to the source device's timing by appropriately controlling their own amount of blanking in the frame.

In one example, when the adaptive sync capability mode is enabled in the MIPI DSI Command Mode display panels, the MIPI DSI Command Mode display panels can extend their blanking to align themselves with the frame timings from the source device. During this time, the source device is aware that the MIPI DSI Command Mode display panels are expecting a refresh at a specific time. The MIPI DSI Command Mode display panels can continue to extend their blanking until a frame start indication is received from the source device. In this case, the MIPI DSI Command Mode display panels do not replay frame data from local buffers when waiting for the frame start indication because the source device is guaranteed to send next frame data within a specified time.

In one example, the source device can wait for TEs to be available for the multiple MIPI DSI Command Mode display panels before sending the same frame start indication to the multiple MIPI DSI Command Mode display panels. In other words, in multi-segment displays, the source device connected to the MIPI DSI Command Mode display panels can wait for TE pin(s) to toggle (or wait to receive the TE event(s) from the multiple MIPI DSI Command Mode display panels) before sending the frame start indication to the multiple MIPI DSI Command Mode display panels. The source device can wait for the TE pin(s) to toggle before starting to send frame data for the next frame to the multiple MIPI DSI Command Mode display panels using write memory start commands or write memory continue long packet commands. In this case, the frame start indication can be the first write memory start command or first write memory continue command for the frame. The first write memory start command or first write memory continue command can indicate that this is the start of the next frame. For the MIPI DSI Command Mode display panels, the refresh can occur with the frame start indication (i.e., the MIPI DSI Command Mode display panels can begin to show received frame data upon receipt of the frame start indication). The multiple MIPI DSI Command Mode display panels can extend their blanking until the same frame start indication is received from the source. At that point, the multiple MIPI DSI Command Mode display panels can start displaying the new frame concurrently, thereby achieving synchronization between the multiple MIPI DSI Command Mode display panels.

In one example, the source device that provides the frame data can be separate from the MIPI DSI Command Mode display panels that show the frame data. For example, the source device can be remotely located or external to the MIPI DSI Command Mode display panels. On the other hand, in some cases, the source device may be integrated with the MIPI DSI Command Mode display panels. In this example, the source device may be internal to the MIPI DSI Command Mode display panels. In another example, the source device may reside in one of the MIPI DSI Command Mode display panels, and the source device may provide frame data to the other MIPI DSI Command Mode display panels.

In one example, to maintain synchronization between the multiple MIPI DSI Command Mode display panels, each of the MIPI DSI Command Mode display panels can communicate with the source device, as opposed to the MIPI DSI Command Mode display panels communicating between themselves to maintain the synchronization.

Figure 2:
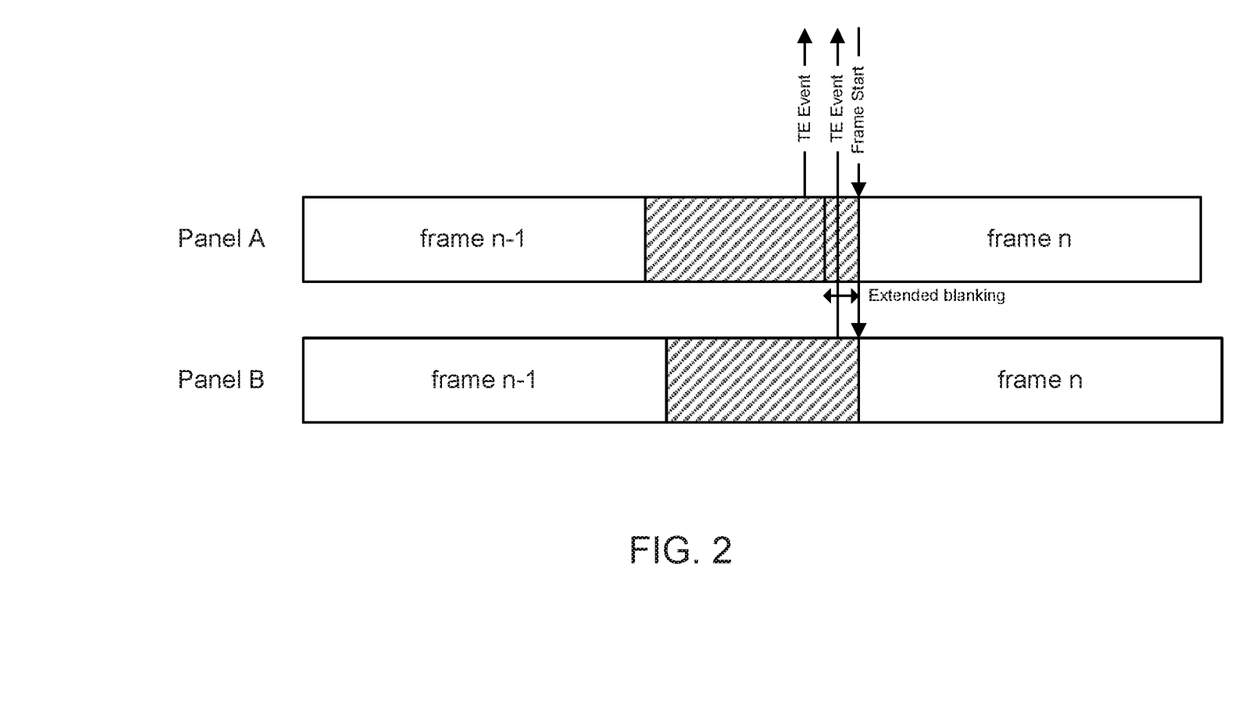
FIG. 2 illustrates a technique for applying dynamic refresh rate switching (DRRS) to multi-segment displays in accordance with an example embodiment.

FIG. 2 illustrates an exemplary technique for applying dynamic refresh rate switching (DRRS) to multi-segment displays. A first MIPI DSI Command Mode display panel (Panel A) and a second MIPI DSI Command Mode display panel (Panel B) can show respective frames n-1. The first MIPI DSI Command Mode display panel can stop showing frame n-1 before the second MIPI DSI Command Mode display panel stops showing frame n-1. In other words, the second MIPI DSI Command Mode display panel can show frame n-1 for a longer duration as compared to the first MIPI DSI Command Mode display panel. In both cases, after frame n-1 is shown, the first and second MIPI DSI Command Mode display panels can start blanking. During this blanking period, the first MIPI DSI Command Mode display panel can request next frame data by sending a TE event to a source device. After the first MIPI DSI Command Mode display panel requests next frame data, the second MIPI DSI Command Mode display panel can also request next frame data by sending a separate TE event to the source device. The first MIPI DSI Command Mode display panel can still be blanking when the second MIPI DSI Command Mode display panel sends the TE event to the source device. The first MIPI DSI Command Mode display panels can extend its blanking duration while the second MIPI DSI Command Mode display panel is sending the TE event to the source event. After the source device receives the TE events from both the first and second MIPI DSI Command Mode display panels, the source device can send a same frame start indication to the first and second MIPI DSI Command Mode display panels. After receiving the same frame start indication, the first and second MIPI DSI Command Mode display panels can synchronously show received frame data (e.g., frame n). In other words, since the first and second MIPI DSI Command Mode display panels concurrently receive the same frame start indication, the first and second MIPI DSI Command Mode display panels can begin displaying the frame data at the same time.

Figure 3:
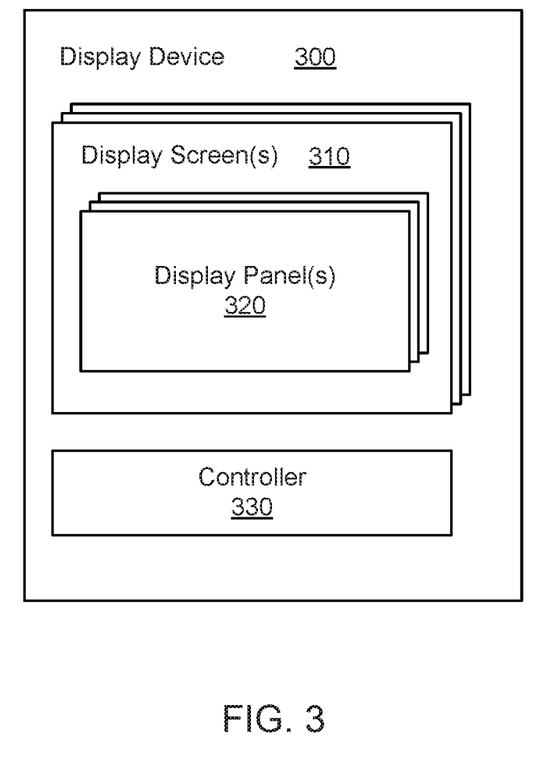
FIG. 3 illustrates a display device in accordance with an example embodiment.

FIG. 3 illustrates an example of a display device 300. The display device 300 can include one or more display screens 310 operable to show at least two display panels 320 (e.g., MIPI DSI Command Mode display panels that support DRRS). The display device 300 can include a controller 330. The controller 330 can send a request (e.g., a TE event message) for frame data from each of the at least two display panels 320 to a source device (not shown). The controller 330 can receive, from the source device, a same frame indication for each of the at least two display panels 320. The controller 330 can provide frame data received from the source device based on the same frame indication to the at least two display panels 320. The same frame indication can cause the at least two display panels 320 to synchronously display frame data received from the source device.

In one example, the request for frame data from each of the at least two display panels 320 can be sent to the source device via the controller 330 at a different time. The at least two display panels 320 can extend a blanking time after sending requests for frame data until the same frame indication for each of the at least two display panels 320 is received from the source device. The same frame indication can be received for each of the at least two display panels 320 via the controller 330 after the request for frame data from each of the at least two display panels 320 is received at the source device.

In one example, a display refresh rate for each of the at least two display panels 320 can be managed via the source device using a dynamic refresh rate switching (DRRS) capability in the at least two display panels 320. The at least two display panels 320 can dynamically modify a display refresh rate on a frame level to achieve synchronization between the display refresh rate for the at least two display panels 320. The synchronization between the at least two display panels 320 can be achieved via the source device and without communication between the at least two display panels 320.

In one example, the one or more display screens 310 can include a single display screen to show the at least two display panels 320. In another example, the one or more display screens 310 can include a separate display screen to show each of the at least two display panels 320. In yet another example, the display device 300 can be a foldable display device or a display device with a segmented display screen for showing the at least two display panels 320.

Figure 4:
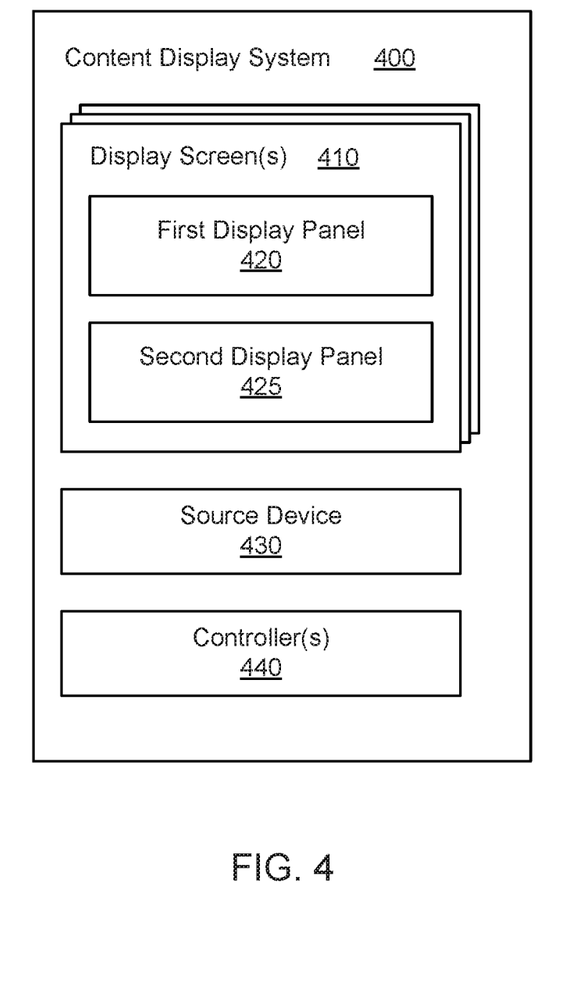
FIG. 4 illustrates a content display system in accordance with an example embodiment.

FIG. 4 illustrates an example of a content display system 400. The content display system 400 can include one or more display screens 410 operable to show a first display panel 420 and a second display panel 425. The content display system 400 can include a source device 430. The content display system 400 can include one or more controllers 440. The controller(s) 440 can send requests for frame data from the first and second display panels 420, 425 to the source device 430. The controller(s) 440 can receive, from the source device 430, a same frame indication for the first display panel 420 and the second display panel 425 after both frame data requests are received at the source device 430. The controller(s) 440 can provide frame data received from the source device 430 based on the same frame indication to the first display panel 420 and the second display panel 425. The same frame indication can cause the first display panel 420 and the second display panel 425 to synchronously display frame data received from the source device 430.

Figure 5:
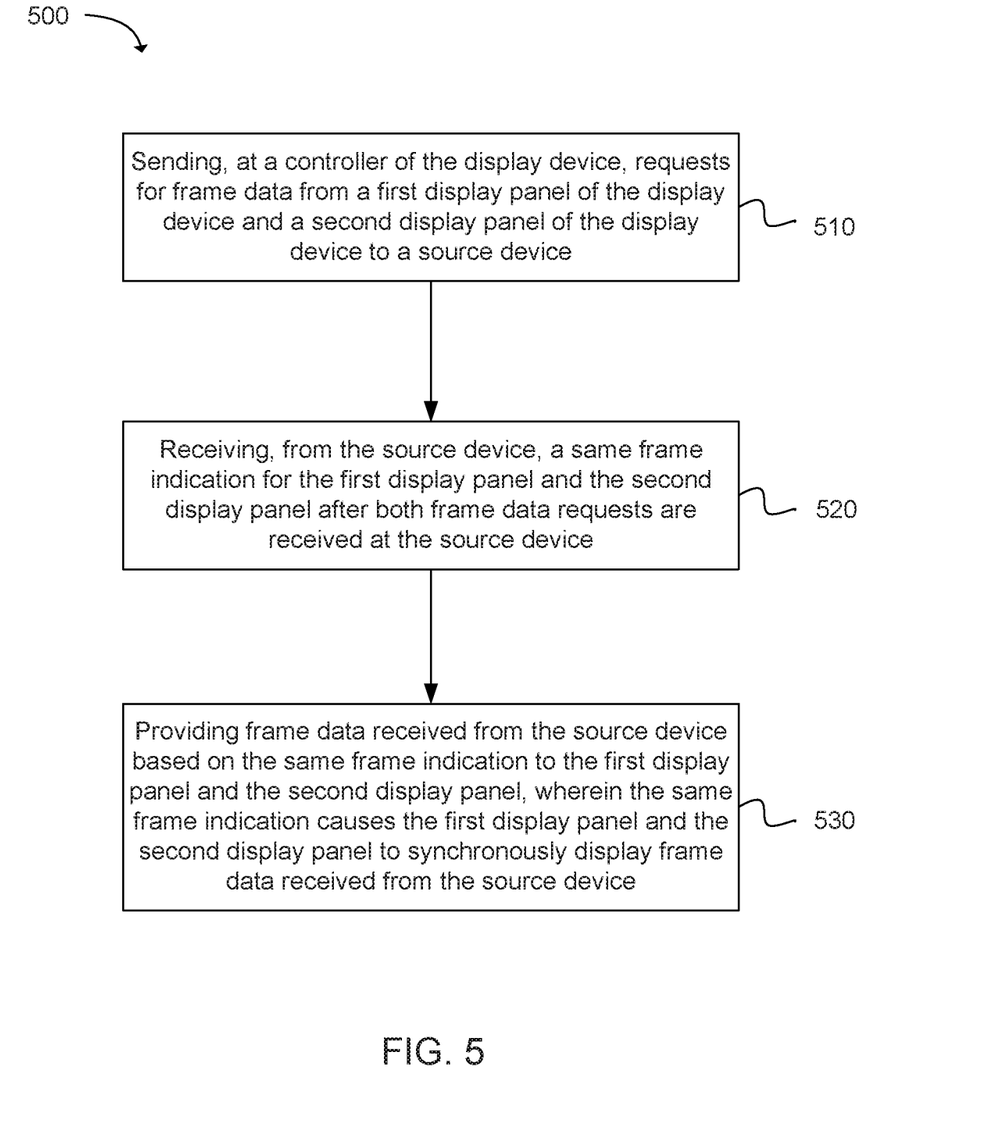
FIG. 5 is a flowchart illustrating operations for synchronizing display panels on a display device in accordance with an example embodiment.

Another example as shown in FIG. 5 provides a method 500 for synchronizing display panels on a display device. The method can be executed as instructions on a machine, where the instructions are included on at least one computer readable medium or one non-transitory machine readable storage medium. The method can include the operation of: sending, at a controller of the display device, requests for frame data from a first display panel of the display device and a second display panel of the display device to a source device, as in block 510. The method can include the operation of: receiving, from the source device, a same frame indication for the first display panel and the second display panel after both frame data requests are received at the source device, as in block 520. The method can include the operation of: providing frame data received from the source device based on the same frame indication to the first display panel and the second display panel, wherein the same frame indication causes the first display panel and the second display panel to synchronously display frame data received from the source device, as in block 530.

Figure 6:
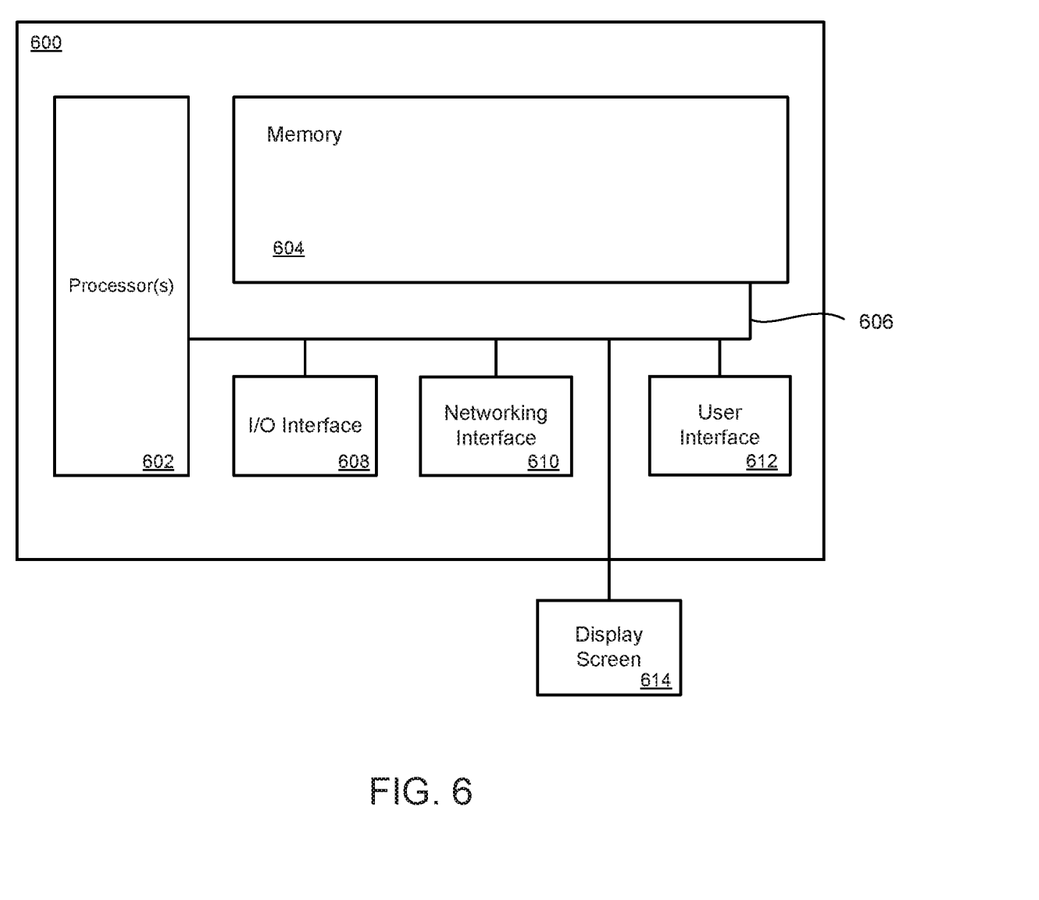
FIG. 6 illustrates a computing system that includes a data storage device in accordance with an example embodiment.

FIG. 6 illustrates a general computing device 600 that can be employed in the present technology. The computing device 600 can include a processor 602 in communication with a memory 604. The memory 604 can include any device, combination of devices, circuitry, and the like that is capable of storing, accessing, organizing, and/or retrieving data. Non-limiting examples include SANs (Storage Area Network), cloud storage networks, volatile or non-volatile RAM, phase change memory, optical media, hard-drive type media, and the like, including combinations thereof.

The computing device 600 additionally includes a local communication interface 606 for connectivity between the various components of the system. For example, the local communication interface 606 can be a local data bus and/or any related address or control busses as may be desired.

The computing device 600 can also include an I/O (input/output) interface 608 for controlling the I/O functions of the system, as well as for I/O connectivity to devices outside of the computing device 600. A network interface 610 can also be included for network connectivity. The network interface 610 can control network communications both within the system and outside of the system. The network interface can include a wired interface, a wireless interface, a Bluetooth interface, optical interface, and the like, including appropriate combinations thereof. Furthermore, the computing device 600 can additionally include a user interface 612, a display device 614, as well as various other components that would be beneficial for such a system.

The processor 602 can be a single or multiple processors, and the memory 604 can be a single or multiple memories. The local communication interface 606 can be used as a pathway to facilitate communication between any of a single processor, multiple processors, a single memory, multiple memories, the various interfaces, and the like, in any useful combination.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations. Exemplary systems or devices can include without limitation, laptop computers, tablet computers, desktop computers, smart phones, computer terminals and servers, storage databases, and other electronics which utilize circuitry and programmable memory, such as household appliances, smart televisions, digital video disc (DVD) players, heating, ventilating, and air conditioning (HVAC) controllers, light switches, and the like.

EXAMPLES

The following examples pertain to specific invention embodiments and point out specific features, elements, or steps that can be used or otherwise combined in achieving such embodiments.

In one example, there is provided a display device. The display device can include one or more display screens operable to show at least two display panels. The display device can include a controller. The controller can comprise logic to send a request for frame data from each of the at least two display panels to a source device. The controller can comprise logic to receive, from the source device, a same frame indication for each of the at least two display panels. The controller can comprise logic to provide frame data received from the source device based on the same frame indication to the at least two display panels. The same frame indication can cause the at least two display panels to synchronously display frame data received from the source device.

In one example of the display device, the at least two display panels are configured to extend a blanking time after sending requests for frame data until the same frame indication for each of the at least two display panels is received from the source device.

In one example of the display device, a display refresh rate for each of the at least two display panels is managed via the source device using a dynamic refresh rate switching (DRRS) capability in the at least two display panels.

In one example of the display device, the at least two display panels are configured to dynamically modify a display refresh rate on a frame level to achieve synchronization between the display refresh rate for the at least two display panels.

In one example of the display device, the request for frame data from each of the at least two display panels is sent to the source device at a different time.

In one example of the display device, the same frame indication is received for each of the at least two display panels after the request for frame data from each of the at least two display panels is received at the source device.

In one example of the display device, the at least two display panels are Mobile Industry Processor Interface (MIPI) Display Serial Interface (DSI) Command Mode display panels that are configured with dynamic refresh rate switching (DRRS).

In one example of the display device, synchronization between the at least two display panels is achieved via the source device and without communication between the at least two display panels.

In one example of the display device, the request for frame data is a tearing enable (TE) event message.

In one example of the display device, the source device is located external to the display device.

In one example of the display device, the source device is located internal to the display device.

In one example of the display device, the one or more display screens includes a single display screen to show the at least two display panels.

In one example of the display device, the one or more display screens includes a separate display screen to show each of the at least two display panels.

In one example of the display device, the display device is a foldable display device or a display device with a segmented display screen for showing the at least two display panels.

In one example there is provided a content display system. The content display system can include one or more display screens operable to show a first display panel and a second display panel. The content display system can include a source device. The content display system can include one or more controllers. The controller(s) can include logic to send requests for frame data from the first and second display panels to the source device. The controller(s) can include logic to receive, from the source device, a same frame indication for the first display panel and the second display panel after both frame data requests are received at the source device. The controller(s) can include logic to provide frame data received from the source device based on the same frame indication to the first display panel and the second display panel. The same frame indication can cause the first display panel and the second display panel to synchronously display frame data received from the source device.

In one example of the content display system, the first display panel and the second display panel are configured to extend a blanking time after sending requests for frame data until the same frame indication for the first display panel and the second display panel is received from the source device.

In one example of the content display system, a display refresh rate for the first display panel and the second display panel is managed via the source device using a dynamic refresh rate switching (DRRS) capability of the first display panel and the second display panel.

In one example of the content display system, the first display panel and the second display panel are configured to dynamically modify a display refresh rate on a frame level to achieve synchronization between the display refresh rate for the first display panel and the second display panel.

In one example of the content display system, the requests for frame data from the first and second display panels are sent to the source device at separate times.

In one example of the content display system, the first display panel and the second display panel are Mobile Industry Processor Interface (MIPI) Display Serial Interface (DSI) Command Mode display panels that are configured with dynamic refresh rate switching (DRRS).

In one example of the content display system, synchronization between the first display panel and the second display panel is achieved via the source device and without communication between the first display panel and the second display panel.

In one example of the content display system, the one or more display screens include a single display screen to show the first display panel and the second display panel, or the one or more display screens include a first display screen to show the first display panel and a second display screen to show the second display panel.

In one example there is provided a method for synchronizing display panels on a display device. The method can include the operation of: sending, at a controller of the display device, requests for frame data from a first display panel of the display device and a second display panel of the display device to a source device. The method can include the operation of: receiving, from the source device, a same frame indication for the first display panel and the second display panel after both frame data requests are received at the source device. The method can include the operation of: providing frame data received from the source device based on the same frame indication to the first display panel and the second display panel, wherein the same frame indication causes the first display panel and the second display panel to synchronously display frame data received from the source device.

In one example of the method for synchronizing display panels on the display device, the first display panel and the second display panel are configured to extend a blanking time after sending requests for frame data until the same frame indication for the first display panel and the second display panel is received from the source device.

In one example of the method for synchronizing display panels on the display device, a display refresh rate for the first display panel and the second display panel is managed via the source device using a dynamic refresh rate switching (DRRS) capability of the first display panel and the second display panel.

In one example of the method for synchronizing display panels on the display device, the first display panel and the second display panel are configured to dynamically modify a display refresh rate on a frame level to achieve synchronization between the display refresh rate for the first display panel and the second display panel.

In one example of the method for synchronizing display panels on the display device, the first display panel and the second display panel are Mobile Industry Processor Interface (MIPI) Display Serial Interface (DSI) Command Mode display panels that are configured with dynamic refresh rate switching (DRRS).

In one example of the method for synchronizing display panels on the display device, synchronization between the first display panel and the second display panel is achieved via the source device and without communication between the first display panel and the second display panel.

In one example there is provided a method of making a display device operable to synchronize frame data shown on multiple display panels of one or more display screens. The method can include the operation of: providing one or more output screens operable to show at least two display panels. The method can include the operation of: communicatively coupling a controller to the one or more output screens. The method can include the operation of: configuring the controller with logic to: send requests for frame data from the at least two display panels, receive a same frame indication for the at least two display panels, and provide frame data based on the same frame indication to the at least two display panels, wherein the same frame indication causes the at least two display panels to synchronously display the frame data.

In one example of the method of making the display device, the at least two display panels are Mobile Industry Processor Interface (MIPI) Display Serial Interface (DSI) Command Mode display panels that are configured with dynamic refresh rate switching (DRRS).

In one example of the method of making the display device, the requests for frame data are tearing enable (TE) event messages.

In one example of the method of making the display device, the at least two display panels include a separate display screen to show each of the at least two display panels.

In one example of the method of making the display device, the display device is a foldable display device or a display device with a segmented display screen.

In one example there is provided a controller configured to control one or more display screens operable to show at least two display panels, the controller comprising logic to: send a request for frame data from each of the at least two display panels to a source device; receive, from the source device, a same frame indication for each of the at least two display panels; and provide frame data received from the source device based on the same frame indication to the at least two display panels, wherein the same frame indication causes the at least two display panels to synchronously display frame data received from the source device.

In one example of a controller, the controller further comprises logic to extend a blanking time of the at least two display panels after sending requests for frame data until the same frame indication for each of the at least two display panels is received from the source device.

In one example of a controller, the controller further comprises logic to allow a display refresh rate for each of the at least two display panels to be managed via the source device using a dynamic refresh rate switching (DRRS) capability in the at least two display panels.

In one example of a controller, the controller further comprises logic to dynamically modify a display refresh rate on a frame level to achieve synchronization between the display refresh rate for the at least two display panels.

In one example of a controller, the controller further comprises logic to send the request for frame data from each of the at least two display panels to the source device at a different time.

In one example of a controller, the controller further comprises logic to receive the same frame indication for each of the at least two display panels after the request for frame data from each of the at least two display panels is received at the source device.

While the forgoing examples are illustrative of the principles of invention embodiments in one or more particular applications, it will be apparent to those of ordinary skill in the art that numerous modifications in form, usage and details of implementation can be made without the exercise of inventive faculty, and without departing from the principles and concepts of the disclosure.

What is claimed is:

1. A display device, comprising:
   at least two display panels, including a first display panel and a second display panel; and
   a controller, including logic to:
   send a first Tearing Enable (TE) event message from the first display panel to a source device and send a second TE event message from the second display panel to the source device, wherein the first TE event message and the second TE event message are sent at different times, and the source device is to wait for both the first TE event message and the second TE event message before sending frame data for a next frame to the first display panel and the second display panel;
   receive, from the source device, a same frame indication for the first display panel and the second display panel, wherein the same frame indication is specific to Mobile Industry Processor Interface (MIPI) Display Serial Interface (DSI) Command Mode display panels; and provide the frame data received from the source device for the next frame based on the same frame indication to the first display panel and the second display panel, wherein the same frame indication causes the first display panel and the second display panel to synchronously display the frame data received from the source device, wherein (i) the first display panel is to stop display of a current frame preceding the next frame before the second display panel is to stop display of the current frame, (ii) the first display panel is to send the first TE event message before the second display panel is to send the second TE event message, the second display panel to send the second TE event message while the first display panel is in a blanking period, and (iii) the first display panel is to extend the blanking period until the same frame indication is received from the source device.

2. The display device of claim 1, wherein a display refresh rate for the first display panel and the second display panel is managed via the source device using a dynamic refresh rate switching (DRRS) capability in the first display panel and the second display panel.

3. The display device of claim 1, wherein the at least two display panels are configured to dynamically modify a display refresh rate on a frame level to achieve synchronization between the display refresh rate for the at least two display panels.

4. The display device of claim 1, wherein the MIPI DSI Command Mode display panels are configured with dynamic refresh rate switching (DRRS).

5. The display device of claim 1, wherein synchronization between the at least two display panels is achieved via the source device and without communication between the at least two display panels.

6. The display device of claim 1, wherein the source device is located external to the display device.

7. The display device of claim 1, wherein the source device is located internal to the display device.

8. The display device of claim 1, further including one or more display screens, the one or more display screens including a single display screen to show the at least two display panels.

9. The display device of claim 1, further including one or more display screens, the one or more display screens including a first display screen to show the first display panel and a second display screen to show the second display panel.

10. The display device of claim 1, wherein the display device is a foldable display device or a display device with a segmented display screen for showing the at least two display panels.

11. A content display system, comprising:
a first display panel and a second display panel;
a source device; and
one or more controllers, including logic to:
send a first Tearing Enable (TE) event message from the first display panel to the source device and send a second TE event message from the second display panel to the source device, wherein the first TE event message and the second TE event message are sent at different times;
receive, from the source device, a same frame indication for the first display panel and the second display panel after both the first TE event message and the second TE event message are received at the source device, wherein the same frame indication is specific to Mobile Industry Processor Interface (MIPI) Display Serial Interface (DSI) Command Mode display panels that include the first display panel and the second display panel, and the source device is to wait for both the first TE event message and the second TE event message before sending frame data for a next frame to the first display panel and the second display panel; and
provide the frame data received from the source device for the next frame based on the same frame indication to the first display panel and the second display panel, wherein the same frame indication causes the first display panel and the second display panel to synchronously display frame data received from the source device, wherein (i) the first display panel is to stop display of a current frame preceding the next frame before the second display panel is to stop display of the current frame, (ii) the first display panel is to send the first TE event message before the second display panel is to send the second TE event message, the second display panel to send the second TE event message while the first display panel is in a blanking period, and (iii) the first display panel is to extend the blanking period until the same frame indication is received from the source device.

12. The content display system of claim 11, wherein a display refresh rate for the first display panel and the second display panel is managed via the source device using a dynamic refresh rate switching (DRRS) capability of the first display panel and the second display panel.

13. The content display system of claim 11, wherein the first display panel and the second display panel are configured to dynamically modify a display refresh rate on a frame level to achieve synchronization between the display refresh rate for the first display panel and the second display panel.

14. The content display system of claim 11, wherein the first display panel and the second display panel are MIPI DSI Command Mode display panels that are configured with dynamic refresh rate switching (DRRS).

15. The content display system of claim 11, wherein synchronization between the first display panel and the second display panel is achieved without communication between the first display panel and the second display panel.

16. The content display system of claim 11, further including one or more display screens, wherein:
the one or more display screens include a single display screen to show the first display panel and the second display panel; or
the one or more display screens include a first display screen to show the first display panel and a second display screen to show the second display panel.

17. A method of making a display device operable to synchronize frame data shown on at least two display panels, the method comprising:
providing the at least two display panels, the at least two display panels including a first display panel and a second panel;
communicatively coupling a controller to the at least two display panels; and
configuring the controller with logic to:
send a first Tearing Enable (TE) event message from the first display panel to a source device and second a second TE event message from the second display panel to the source device, wherein the first TE event and the second TE event are sent at different times, and the source device is to wait for both the first TE event message and the second TE event message before sending frame data for a next frame to the first display panel and the second display panel;

receive, from the source device, a same frame indication for the first display panel and the second display panel, wherein the same frame indication is specific to Mobile Industry Processor Interface (MIPI) Display Serial Interface (DSI) Command Mode display panels; and provide the frame data from the source device for the next frame based on the same frame indication to the first display panel and the second display panel, wherein the same frame indication causes the first display panel and the second display panel to synchronously display the frame data, wherein (i) the first display panel is to stop display of a current frame preceding the next frame before the second display panel is to stop display of the current frame, (ii) the first display panel is to send the first TE event message before the second display panel is to send the second TE event message, the second display panel to send the second TE event message while the first display panel is in a blanking period, and (iii) the first display panel is to extend the blanking period until the same frame indication is received from the source device.

18. The method of claim 17, wherein the at least two display panels are MIPI DSI Command Mode display panels that are configured with dynamic refresh rate switching (DRRS).

19. The method of claim 17, wherein the at least two display panels include a separate display screen to show the first display panel and the second display panel.

20. The method of claim 17, wherein the display device is a foldable display device or a display device with a segmented display screen.

21. The display device of claim 1, wherein the same frame indication corresponds to at least one of a write memory start command or a write memory continue command corresponding to the start of the next frame.

22. The content display system of claim 11, wherein the same frame indication corresponds to at least one of a write memory start command or a write memory continue command corresponding to the start of the next frame.

23. The method of claim 17, wherein the same frame indication corresponds to at least one of a write memory start command or a write memory continue command corresponding to the start of the next frame.

\* \* \* \* \*